United States Patent Office 3,371,024
Patented Feb. 27, 1968

3,371,024
PRODUCTION OF CARBONYL- AND NITRILE-CONTAINING COMPOUNDS UNDER FREE RADICAL FORMING CONDITIONS
Harry Emmet Gunning, Edmonton, Alberta, Canada, assignor to Canadian Chemical Company, Ltd., Edmonton, Alberta, Canada, a corporation of Canada
No Drawing. Filed Sept. 5, 1963, Ser. No. 306,693
14 Claims. (Cl. 204—158)

ABSTRACT OF THE DISCLOSURE

Processes for the production of carbonyl- and nitrile-containing compounds which involve, in the case of a one stage process, reacting an unsaturated organic compound having at least one pair of carbon atoms with olefinic, acetylenic or aromatic unsaturation, e.g., ethylene, acetylene or benzene, with nitric oxide under free radical forming conditions. In the case of a two stage process, the unsaturated organic compound is first subjected to free radical forming conditions, then contacted with nitric oxide. In either case, temperatures of from about 25° C. to 1400° C. and pressures of about 1 mm. to 10 atmospheres can be employed.

---

This invention relates to a novel class of chemical reactions. It more particularly relates to a new type of reaction between carbon-carbon unsaturated compounds and nitric oxide to produce at least carbonyl and nitrile-containing compounds.

It is known that nitric oxide will react with compounds such as cyclohexane to produce nitroso derivatives, see Donaruma and Carmody, J. Org. Chem. 22, 635 (1957) and with compounds such as nitroso benzene to form a diazotized phenyl derivative, see Bamberger, Ber. 51, 635 (1918).

It has now been found that it is possible to react nitric oxide with a class of unsaturated compounds so as to produce extremely desirable end products in good yields. By the practice of this process, nitrile-containing compounds such as hydrogen cyanide and simple carbonyl-containing compounds such as formaldehyde as well as exotic compounds such as propynal can be readily produced under extremely simple reaction conditions.

One aspect of the over-all process of this invention envisions the reaction with nitric oxide of an acetylene having a structural formula:

$$A—C\equiv C—B$$

or an olefin having the structural formula:

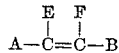

wherein there is apparently no limit on the composition of A, B, E and F other than the fact that these substituents must not to any substantial extent interfere with the production of a free radical at at least one of the multiple bonded carbon atoms. Thus, it is essential to the practice of this invention that the substituents must not interfere with free radical formation of at least one of the multiple bonded carbon atoms electronically, nor may these substituents be such as to sterically hinder either the formation of a free radical or the subsequent reaction of that free radical with nitric oxide, nor should the substituents be such as to be preferentially converted to a free radical state to an extent sufficient to impair the production from the unsaturated compound of a vinyl free radical.

Some exemplary substituents which fulfill all the above conditions include hydrogen, deuterium, tritium, chlorine, bromine, iodine, aldehydes, esters, acids, acid halides, amines (primary, secondary and tertiary), alkyl groups, alkoxy groups, cycloalkyl groups, aryl groups, alkaryl groups and unsaturated substituents corresponding to the above.

Thus the over-all reaction of this invention is between an olefinically, acetylenically or aromatically unsaturated compound and nitric oxide. This reaction can be carried out in one or two stages as desired. In a one stage process, the reactants are brought together under free radical forming conditions and the reaction products are separated and resolved. In a two stage process, the unsaturated reactant is subjected to free radical forming conditions and the product thereof brought together with nitric oxide whereupon the products of the reaction with nitric oxide are separated and resolved.

While not intending to be bound in any way by a discussion of reaction mechanism, one explanation of this reaction to produce the particular products thereof involves a consideration of free radicals. Thus, the reaction mechanism has been postulated to include the formation of vinyl free radicals from the unsaturated reactant and the reaction of these free radicals with nitric oxide. The vinyl free radical may be formed by subjecting the unsaturated reactant to free radical forming conditions. For example, photolysis of mercury, alkyls or phosgene, or certain free radical initiating chemicals such as organic peroxides or inorganic peracids or their salts, or quanta of light, or heat have been known to induce the generation of free radicals.

The reaction mechanism may, of course, be ionic in nature, however, the free radical mechanism appears at this time to be the more correct approach.

Assuming then, for the purposes of explanation, that the instant reaction follows a free radical mechanism, and utilizing acetylene and ethylene (the simplest aliphatic unsaturated compounds) to exemplify the reaction mechanism, it is believed that the reaction takes the following course:

(1) 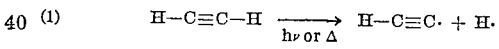

(2) 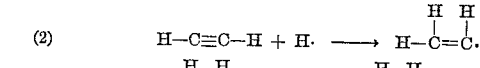

(2a) 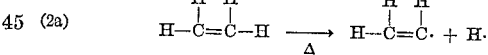

(2b) 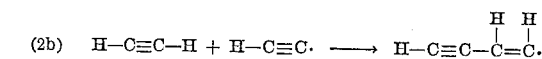

thus forming various vinyl free radicals. The energy to form the free radical may be supplied by direct absorption of light energy, heat, ionizing radiation, and any other methods, plasmas, etc.

Having formed vinyl free radicals, these radicals now readily react with nitric oxide to form four-membered isoxazole intermediates. Exemplifying this reaction, utilizing an unsubstituted vinyl radical, the simplest free radical formed according to this invention, the product is an unsubstituted four-membered isoxazole.

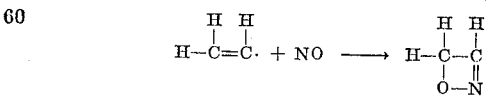

Isoxazoles autodecompose to form a carbonyl compound and a nitrile compound. Thus, the unsubstituted isoxazole autodecomposes to formaldehyde and hydrogen cyanide according to the equation:

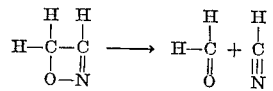

The above discussed reaction mechanism notwithstanding, one of the generic concepts of this invention is the reaction of an acetylene having the formula:

$$A-C\equiv C-B$$

or an olefin having the formula:

$$A-C=C-B$$
$$\phantom{A-}|\phantom{C=C}|$$
$$\phantom{A-}E\phantom{C=C}F$$

wherein A, B, E and F are substantially any substituents with nitric oxide. The nature of these substituents is such that they are less reactive with nitric oxide than is the unsaturation. It is also within the scope of this invention that these substituents may be parts of a cyclic compound, e.g. benzene or cyclohexene, in which case the principal reaction product will be an α—ω aldehyde-nitrile. Also, where the unsaturated compound is cyclic and substituted at the point of unsaturation, e.g. toluene or 1-methylcyclohexene-1, it is possible to obtain a nitrile terminated compound having a ketone substituent.

It is postulated that the intermediate in this reaction is a four-membered isoxazole:

$$\begin{array}{c} |\phantom{xx}| \\ -C-C- \\ |\phantom{xx}\| \\ O-N \end{array}$$

which autodecomposes breaking both the carbon-carbon and nitrogen-oxygen bonds to produce the desired compounds.

It will be apparent to those skilled in this art that if the postulated free radical mechanism of this reaction is true mechanism, then it is possible to obtain from an acetylene having two different substituents A and B, seven different carbonyl compounds and two different nitrile compounds:

$$\begin{array}{ll} A-C\equiv N & B-C\equiv N \\ A & B \\ | & | \\ A-C=O & B-C=O \\ A & A \\ | & | \\ B-C=O & A-C\equiv C-C=O \\ B & A \\ | & | \\ A-C\equiv C-C=O & B-C\equiv C-C=O \\ B & \\ | & \\ B-C\equiv C-C=O & \end{array}$$

It will be understood that, while it is theoretically possible to produce seven different carbonyl compounds, and two different nitrile compounds (with the mole ratio of carbonyl compounds to nitrile compounds being approximately one), it will be apparent that not all the carbonyl compounds nor either of the nitrile compounds will necessarily be present in equal proportions depending upon the composition of the substituents A and B. In general, the location of the principal bond scission (the initial free radical forming step) will be determined primarily by the bond energy between the substituents A or B, etc., and the unsaturated carbon atom to which it is bonded; the weaker of the A—C or B—C, etc., bonds will be broken. The location of addition of the free radical fragments of the initial free radical forming reaction, in the case of an alkyne, will be determined to a great extent by steric factors. For example, where chloroacetylene (Cl—C≡C—H) is the alkyne, the Cl· fragment of the initial free radical forming reaction will most likely add to the hydrogen rather than the chlorine end of the alkyne to produce $$\begin{array}{cc} Cl & Cl \\ | & | \\ H-C=C\cdot \end{array}$$

which will then react with nitric oxide.

Although the above represents the reactions which will predominate, there are competing reactions of greater or lesser importance which must be considered. Thus, the predominant products of this process will generally be either ACN, BCN or both of these nitriles. The class of products which will appear in the next greatest proportion will be simple A and/or B substituted carbonyls. Similar considerations apply where the unsaturated reactant is an olefin rather than an acetylene, i.e., four different nitriles and two different carbonyl compounds are possible:

$$A-C\equiv N,\ B-C\equiv N,\ E-C\equiv N$$
$$\phantom{xxxxxxxx}F\phantom{xxxxx}F$$
$$\phantom{xxxxxxxx}|\phantom{xxxxx}|$$
$$F-C\equiv N,\ A-C=O,\ B-C=O$$

The process of this invention may be carried out in several different ways. For example, it is within the scope of this invention to first subject the unsaturated reactant to free radical forming conditions and thereafter in a second step, react this product with nitric oxide to form the desired end products. It is also possible and probably more practical to introduce an acetylenic or olefinic compound and nitric oxide into a reactor under free radical forming conditions and under conditions such that a reaction between nitric oxide and these free radicals will take place to produce the above noted types of compounds in a single stage. In either case the reaction products can be separated from the reactants and from each other by conventional chemical and physical means, e.g. distillation, extraction, vapor-liquid separation, etc.

The temperature and pressure of the reaction is dependent to a great extent upon the particular unsaturated reactants used. In general, it can be said that free radical forming conditions for an acetylene are a temperature of about 150 to 1400° C., preferably 200 to 900° C. and a pressure of about 1 mm. to 10 atmospheres, preferably 0.1 to 1 atmosphere.

For an olefin, free radical forming conditions are a temperature of about 150 to 1400° C., preferably 200 to 800° C. and a pressure of about 1 mm. to 10 atmospheres, preferably 0.1 to 1 atmosphere.

It is often advantageous to employ a free radical initiating sensitizer in this reaction. Highly excited chlorine, iodine, bromine or hydrogen atoms and cyanide radicals as for example by photolysis, e.g. by Hg vapor lamp irradiation, have been used with success. Triplet state mercury can be used to create these highly excited species, e.g. by irradiation in the presence of mercury vapor with 2537 A. radiation from a mercury resonance lamp through a Vycor 7910 filter. Highly excited hydrogen can be conveniently derived from the unsaturated reactant itself; the excited halogens can be derived from photolysis of phosgene or its other halogen equivalents; and the excited cyanide can be derived from photolysis of cyanogen chloride, CNCl. Since the particular sensitizer (if used) enters into the reaction, it is well to select the particular sensitizer which will evolve into a desired final product.

Other free radical inducing materials, e.g., benzoyl peroxide, acetyl peroxide, sodium persulfate, bis(methane sulfonyl) peroxide, perphosphoric acid, COBr$_2$, SO$_2$Cl$_2$, SOCl$_2$, N-chloro- and N-bromosuccinimide, ethylene dichloride, tetrachlorethylene, oxalyl chloride, hydrazine, hydroxylamine, biacetyl, chlorine, bromine, iodine, hydrogen bromide, hydrogen iodide, iodine monochloride, iodine bromide, methylene chloride, mercaptans, etc. are also included in the purview of this invention.

As has been previously stated, the process of this invention can be carired out in one or two stages at appropriate temperatures and pressures.

The following examples are given by way of illustration and not by limitation. All parts and percentages are by weight therein unless otherwise expressly stated.

EXAMPLE I

Acetylene was reacted with nitric oxide by subjecting about 0.01 mole of acetylene to photosensitization by a mercury vapor lamp at about 25° C. at about 600 mm. HgA pressure. Nitric oxide was introduced, at a rate of about 0.02 mole per mole of acetylene and reacted quantitatively to produce hydrogen cyanide, propynal and formaldehyde.

EXAMPLE II

Under the same conditions as in Example I, phosgene vapor in an amount of about 10% of the reaction mass can be subjected to photolysis by a mercury vapor lamp to produce chlorine sensitizer. Under these conditions, phenylacetylene will react with nitric oxide to produce phenyl cyanide, carbon monoxide and hydrogen chloride (the last two products are the decomposition products of unstable chloro-formaldehyde).

EXAMPLE III

Under the same conditions as in Example II, methyl acetylene and nitric oxide can be reacted to produce acetonitrile and chloro-formaldehyde (decomposes to CO and HCl).

EXAMPLE IV

Under the same conditions as in Example I, hydrogen sulfide can be subjected to photolysis in the presence of acetylene and nitric oxide to produce hydrogen cyanide and formaldehyde.

EXAMPLE V

Under the same conditions as in Example I, phenyl acetylene can be reacted with nitric oxide to produce phenyl cyanide and formaldehyde.

EXAMPLE VI

Under the same conditions as in Example II, dimethyl acetylene can be reacted with nitric oxide to produce acetonitrile and acetyl chloride.

EXAMPLE VII

Under the same conditions as in Example I, dimethyl acetylene can be reacted with nitric oxide to produce acetonitrile and acetaldehyde.

EXAMPLE VIII

Bromotrifluoroethylene can be reacted with nitric oxide in the presence of a mercury vapor lamp to produce difluoro-phosgene and cyanogen fluoride. This reaction can also be initiated by heating to a temperature of 200 to 500° C. to induce free radical formation.

EXAMPLE IX 2-butene can be reacted with nitric oxide at a temperature of about 300–600° C. to produce HCN and acetaldehyde.

EXAMPLE X

Ethylene can be reacted with nitric oxide at 500–800° C. to produce HCN and formaldehyde. This reaction temperature can be reduced to about 300° C. by the inclusion in the reaction mixture of benzoyl peroxide.

It is within the scope of this invention to carry out this reaction either in the liquid or gas phase. It is sometimes practical, and often expedient, to carry out this reaction in a liquid medium which itself does not enter into the reaction but merely serves as an environment for the reaction. This reaction medium is preferably a solvent for the reactants and may be, although it preferably is not, a solvent for the reaction products. It is desirable that the reaction medium be substantially inert to the reaction, reactants and reaction products under the conditions of reaction. Exemplary reaction media including paraffins, e.g. Decalin; polyalkylene glycols, e.g. di or triethylene glycol or a polyethylene glycol having a molecular weight of about 160; terphenyls, e.g. mixed ortho and para-terphenyls; chlorinated phenyls, e.g. mixed chlorinated biphenyls having a boiling point of about 250 to 300° C.; biphenyls including alkyl substituted biphenyls; and phenyl ethers, etc.

It is to be understood that the foregoing detailed description is given merely by way of illustration and that many variations may be made therein without departing from the spirit of my invention.

The embodiments of the invention in which an exclusive property or privilege is claimed are defined as follows:

1. The process which comprises reacting an organic compound selected from the group consisting of acetylenic compounds, bromotrifluoroethylene and ethylene with nitric oxide under free radical forming conditions to produce at least one carbonyl-containing compound and at least one nitrile-containing compound and recovering the products produced.

2. The process as claimed in claim 1, wherein said acetylenic compounds are cyclic compounds and the product contains both carbonyl and nitrile.

3. The process claimed in claim 1, wherein said free radical forming conditions include the introduction of energy into the reaction system.

4. The process claimed in claim 3, wherein said energy is derived from radiation.

5. The process claimed in claim 3, wherein said energy is derived from heat.

6. The process claimed in claim 3, wherein said energy is derived from ionizing radiation.

7. The process claimed in claim 3, wherein said energy is transmitted by means of highly excited species selected from the group consisting of hydrogen, halogen and cyanide.

8. The process of producing HCN and formaldehyde which comprises reacting under free radical forming conditions acetylene and nitric oxide and recovering the products produced.

9. The process as claimed in claim 8 carried out at a temperature of about 150 to 1400° C.

10. The process as claimed in claim 8, wherein said free radical forming conditions include photolytic activation of a material capable of forming active forms of a member of the group consisting of halogen, hydrogen and cyanide.

11. The process which comprises subjecting an acetylenic compound to free radical forming conditions, reacting the product thereof with nitric oxide, and recovering the products produced.

12. The process which comprises subjecting an acetylene to mercury vapor lamp irradiation, reacting the irradiated species with nitric oxide, and recovering at least a nitrile and a carbonyl compound.

13. The process of producing an aldehyde which comprises reacting an acetylene having at least one acetylenic unsaturated carbon atom substituted with only hydrogen with nitric oxide under free radical forming conditions and recovering the products produced.

14. The process as claimed in claim 13, wherein the acetylenic compound is acetylene and the aldehyde is formaldehyde.

References Cited

UNITED STATES PATENTS

| | | | |
|---|---|---|---|
| 2,736,739 | 2/1956 | England | 260—465.3 |
| 2,830,016 | 4/1958 | Cier et al. | 204—162 |
| 3,083,237 | 3/1963 | Haszeldine | 204—158 |

OTHER REFERENCES

"Chemical Abstract," vol. 60 (1964), p. 7607g.

Le Roy: "Canadian Chemistry and Process Industries," June 1944, pp. 430, 431 and 451.

HOWARD S. WILLIAMS, *Primary Examiner*.